May 26, 1931.  H. A. SCHMITZ, JR  1,806,954
ARC WELDING CHILL
Filed Dec. 23, 1929

INVENTOR.
Henry A. Schmitz, Jr.
BY
ATTORNEY.

Patented May 26, 1931

1,806,954

UNITED STATES PATENT OFFICE

HENRY A. SCHMITZ, JR., OF MILWAUKEE, WISCONSIN, ASSIGNOR TO A. O. SMITH CORPORATION, OF MILWAUKEE, WISCONSIN, A CORPORATION OF NEW YORK

ARC WELDING CHILL

Application filed December 23, 1929. Serial No. 416,059.

This invention relates to an electric arc welding chill.

The object of the invention is to provide a compact, self-cooling chill.

A further object is to provide a chill with a large cooling surface and which operates with a minimum of friction.

The invention resides in providing a plurality of chill blocks and successively bringing them into contact with the welding seam as the arc progresses along the same.

The invention is best understood by referring to the accompanying drawings in which.

Figure 1:
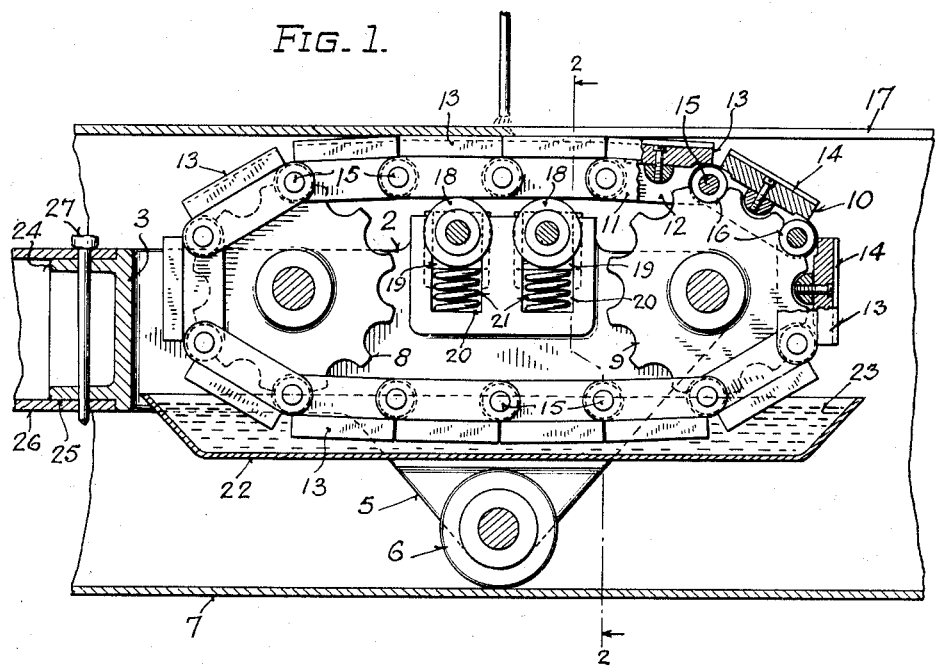
Figure 1 represents a longitudinal central section of the chill arranged in a pipe section being welded.
Figure 2:
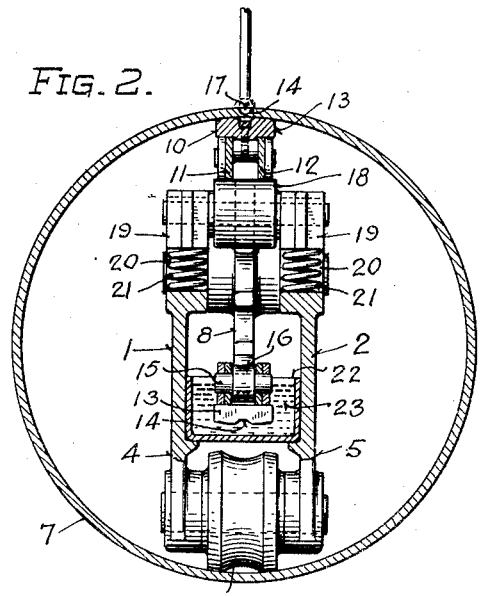
Fig. 2 is a view taken on the line 2—2 of Figure 1.

The chill support comprises a forked frame having spaced brackets 1 and 2 connected by a cross bar 3. On the lower sides of the forks are projections 4 and 5 extending downwardly. A roller 6 mounted between the two projections 4 and 5 supports the chill mechanism within the pipe 7.

Sprocket wheels 8 and 9 are mounted between the brackets 1 and 2 at each end of the frame.

The chill strip is in the form of an endless chain and comprises a plurality of chill blocks 10 pivotally connected end to end in any suitable manner.

The chill blocks comprise a pair of links 11 and 12 and a block of copper 13 suitably mounted thereon which are adapted to bear upon the inner surface of the pipe 7 beneath the arc. The copper blocks 13 are preferably provided with a V-shaped groove 14 on the upper surface thereof to allow penetration of the weld through the metal at the bottom of the edges being welded. The top surfaces of the blocks 13 are preferably rounded to conform to the curvature of the pipe 7 to be welded.

The pins 15 which join the chain of chill blocks 10 are provided with rollers 16 for engaging the sprocket wheels 8 and 9. The chill support is provided with resilient means for raising the chill blocks 10 into contact with the metal of the pipe at the bottom of the welding groove 17. This resilient mechanism comprises a plurality of rollers 18 suitably mounted on blocks 19 which, in turn, move in sockets 20 provided with springs 21. The rollers 18 are adapted to engage the chill blocks 10 directly beneath the arc. Any suitable number of such rollers may be employed.

The chill blocks 10 are cooled upon their return movement by dipping the same into a trough 22 filled with a cooling medium 23.

The frame of the chill mechanism is equipped with a suitable extension 24 which is adapted to engage in a corresponding socket 25 in the end of a mandrel 26. This extension is held in place in said socket by means of a removable pin 27 which enables the chill to be easily detached from the mandrel.

In the operation of the device, the movement of the endless chain is effected by the frictional contact between the work and the chill blocks so that the chill blocks will be progressively brought into contact with the seam at a speed directly corresponding to the progress of the arc along the seam, thus constantly presenting new chill areas to the metal being heated and welded.

After contact with the edges, each chill block passes into the tray of water or other cooling medium to cool it preparatory for chilling the molten metal when the block again contacts with the metal in the next cycle of operation.

When the end of the seam has been reached, the pin which holds the chill to the mandrel may be removed so that the mandrel can be rapidly withdrawn from the pipe.

I claim:

1. In a welding chill, a plurality of chill members, and means for guiding the same successively into contact with the seam being welded.

2. In a welding chill, a plurality of chill members, and means movable relative to said chill members for supporting successive groups of said members against the seam being welded.

3. In a welding chill, a plurality of chill members, means for supporting a chill member against the seam being welded, and means for successively guiding said chill members to said supporting means whereby said chill members are successively brought into contact with the seam being welded.

4. In a welding chill, a plurality of chill members movable in the direction of the seam being welded, means for supporting the same, pressure means to hold a plurality of said members against the seam being welded, and means for moving said support along the seam being welded.

5. In a welding chill, an endless chain of chill members, means for supporting the same, pressure means to hold a plurality of said members against the article to be chilled, and means for successively bringing said chill members into contact with the seam being welded.

6. In a welding chill, an endless chain of chill members, means for supporting the same, pressure means to hold a plurality of said members against the seam to be welded, means for cooling said chill members, and means for bringing said members successively into contact with said seam to be welded.

7. An arc welding chill, comprising an endless chain of chill members, means for supporting the same, means for progressively conducting the chill apparatus along the seam to be welded, pressure means for holding a plurality of said chill members against the seam being welded, and means for cooling said chill members.

8. An arc welding chill, comprising an endless chain of linked chill members, a supporting mandrel adapted to move relatively along the seam to be welded at a speed corresponding to the rate at which the welding arc relatively progresses along the seam and to support said endless chain of chill members, means to press chill members on one side of said endless chain successively into contact with the metal of the seam adjacent to the welding arc, and means to cool said chill members as they return on the opposite side of said endless chain.

9. In a welding chill, a plurality of chill members, and means for guiding the same successively into contact with the portion of the seam under the welding arc for continually providing cool chill surfaces.

10. In a welding chill, a plurality of movable chill blocks, and means for successively supporting a plurality of said chill blocks in frictional engagement with the seam being welded.

11. In a welding chill, a frame, a plurality of chill blocks, means for movably supporting said chill blocks upon said frame, means for successively presenting said blocks to the seam adjacent the arc, pressure means to hold a plurality of said blocks against the seam being welded, and means for moving the frame parallel to the seam being welded.

In witness whereof I have signed my name at Milwaukee, Wisconsin, this 21st day of December, 1929.

HENRY A. SCHMITZ, Jr.